US012562500B2

(12) United States Patent
Wayton et al.

(10) Patent No.: US 12,562,500 B2
(45) Date of Patent: Feb. 24, 2026

(54) MULTI-LAYER FEEDBOARD FOR 8T8R ANTENNA ARRAY WITHIN COMPACT ANTENNA

(71) Applicant: JOHN MEZZALINGUA ASSOCIATES, LLC., Liverpool, NY (US)

(72) Inventors: Evan Wayton, Tully, NY (US); Karthik Janardhanan, Syracuse, NY (US); Ghanshyam Mishra, Chicago, IL (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 66 days.

(21) Appl. No.: 18/696,249

(22) PCT Filed: Nov. 2, 2023

(86) PCT No.: PCT/US2023/036662
§ 371 (c)(1),
(2) Date: Mar. 27, 2024

(87) PCT Pub. No.: WO2024/097330
PCT Pub. Date: May 10, 2024

(65) Prior Publication Data

US 2025/0047012 A1 Feb. 6, 2025

Related U.S. Application Data

(60) Provisional application No. 63/422,052, filed on Nov. 3, 2022.

(51) Int. Cl.

| | |
|---|---|
| ***H01Q 21/08*** | (2006.01) |
| ***H01Q 5/42*** | (2015.01) |
| ***H01Q 21/20*** | (2006.01) |

(52) U.S. Cl.
CPC ............. *H01Q 21/205* (2013.01); *H01Q 5/42* (2015.01)

(58) Field of Classification Search
CPC ...... H01Q 21/06; H01Q 21/062; H01Q 21/08; H01Q 21/205; H01Q 21/24; H01Q 5/40; H01Q 5/42
See application file for complete search history.

(56) References Cited

U.S. PATENT DOCUMENTS

2010/0045554 A1 2/2010 Xu et al.
2011/0221649 A1* 9/2011 Price ..................... H01P 11/003 333/238

(Continued)

FOREIGN PATENT DOCUMENTS

CN 111987435 A 11/2020
CN 112117533 A 12/2020
CN 114678684 A 6/2022

*Primary Examiner* — Thai Pham
(74) *Attorney, Agent, or Firm* — BRYAN CAVE LEIGHTON PAISNER LLP

(57) ABSTRACT

An antenna has a plurality of columns of C-Band radiators whereby each of the columns of C-Band radiators is supported by a single multilayer feedboard. The multilayer feedboard has a first signal layer disposed on an upper surface; a first ground layer; a second signal layer, and a second ground layer disposed on a lower surface. The solder joints for the coupling the RF signal cable outer conductors, and all of the solder joints for coupling the signals to the −45 and +45 dipoles to each of the C-Band radiators, are disposed on the second ground layer for ease of manufacture.

16 Claims, 13 Drawing Sheets

(56) References Cited

U.S. PATENT DOCUMENTS

| | | | | |
|---|---|---|---|---|
| 2018/0227775 | A1 * | 8/2018 | Bisiules | H01Q 21/08 |
| 2018/0367199 | A1 * | 12/2018 | Zimmerman | H01Q 25/001 |
| 2023/0010745 | A1 * | 1/2023 | Sundararajan | H01Q 1/246 |
| 2024/0304988 | A1 * | 9/2024 | Jang | H01Q 15/14 |

* cited by examiner

MULTI-LAYER FEEDBOARD FOR 8T8R ANTENNA ARRAY WITHIN COMPACT ANTENNA

CROSS-REFERENCE TO RELATED APPLICATIONS

This application is a National Stage Application of International Application No. PCT/US23/36662 filed on Nov. 2, 2023, which claims the benefit of U.S. Provisional Application No. 63/422,052, filed on Nov. 3, 2022, all of which are incorporated by reference in their entirety herein.

BACKGROUND OF THE INVENTION

Field of the Invention

The present invention relates to wireless communications, and more particularly, to a method and a device for ultra-dense antennas for urban and indoor deployment.

Related Art

Recent developments in cellular communications include Massive MIMO (Multiple Input Multiple Output) and beamforming technologies that enable multiple handsets or UEs (User Equipment) to use the same spectrum resourced by spatially multiplexing more UEs that are physically separated. One such technology for implementing Massive MIMO is referred to 8T8R (Eight Transmit Eight Receive), whereby four columns of antenna dipoles, each of which transmit and receive in two orthogonal polarization states, may provide multiple beams, each to a different UE that is azimuthally spaced (i.e., in the horizontal plane). 8T8R arrays typically operate in the C-Band (3.7-8 GHz). 8T8R arrays may be deployed in multi-band antennas that also have dipole arrays that operate in other frequency bands, such as the Mid Band (1.7-2.7 GHz) and in CBRS (Citizens Broadband Radio Service) frequency bands of 3.4-3.8 GHz. Further, an exemplary deployment of all of these dipole arrays may be in a quasi-omni antenna configuration, in which three array faces, each having an 8T8R array, a Midband array, and a CBRS array are mounted on a reflector plate, and the three reflector plates with their array assemblies are mounted at 120 degree azimuth spacing.

Challenges arise in designing such quasi-omni antennas in that the different antenna arrays must be designed to be as dense as possible so that all this capability may be mounted within a small cylindrical radome. Accordingly, great efforts must be made to have each antenna array (including the 8T8R array) take up as little room as possible without sacrificing performance or capability.

SUMMARY OF THE DISCLOSURE

An aspect of the present disclosure involves an antenna having a plurality of columns of radiators, wherein each column of radiators has a multilayer feedboard. The multilayer feedboard comprises a first signal layer disposed on an upper surface of a first PCB (Printed Circuit Board) layer, the first signal layer having a first signal launch and a second signal launch, the first signal layer having a first signal trace coupled to the first signal launch, wherein the first signal trace has a plurality of first signal trace branches wherein each of the plurality of first signal trace branches is coupled to a first signal via, and wherein the first signal layer has a second signal main via that is coupled to the second signal launch; a first ground layer disposed between the first PCB layer and a second PCB layer, the first ground layer having a plurality of mode suppression vias, and a plurality of isolation gaps, each isolation gap surrounding a corresponding first signal via; a second signal layer disposed between the second PCB layer and a third PCB layer, the second signal layer having a second signal trace with a plurality of second signal trace branches, each of the second signal trace branches is coupled to one of a plurality of second signal vias, wherein the second signal trace is electrically coupled to the second signal main via; and a second ground layer disposed on a lower surface of the third PCB layer, the second ground layer having a plurality open regions within each of which is disposed one of a first signal island conductor and a second signal island conductor, wherein each of the first signal island conductors is coupled to a corresponding first signal via and each of the second signal island conductors is coupled to a corresponding second signal via.

DESCRIPTION OF EXEMPLARY EMBODIMENTS

Figure 1:
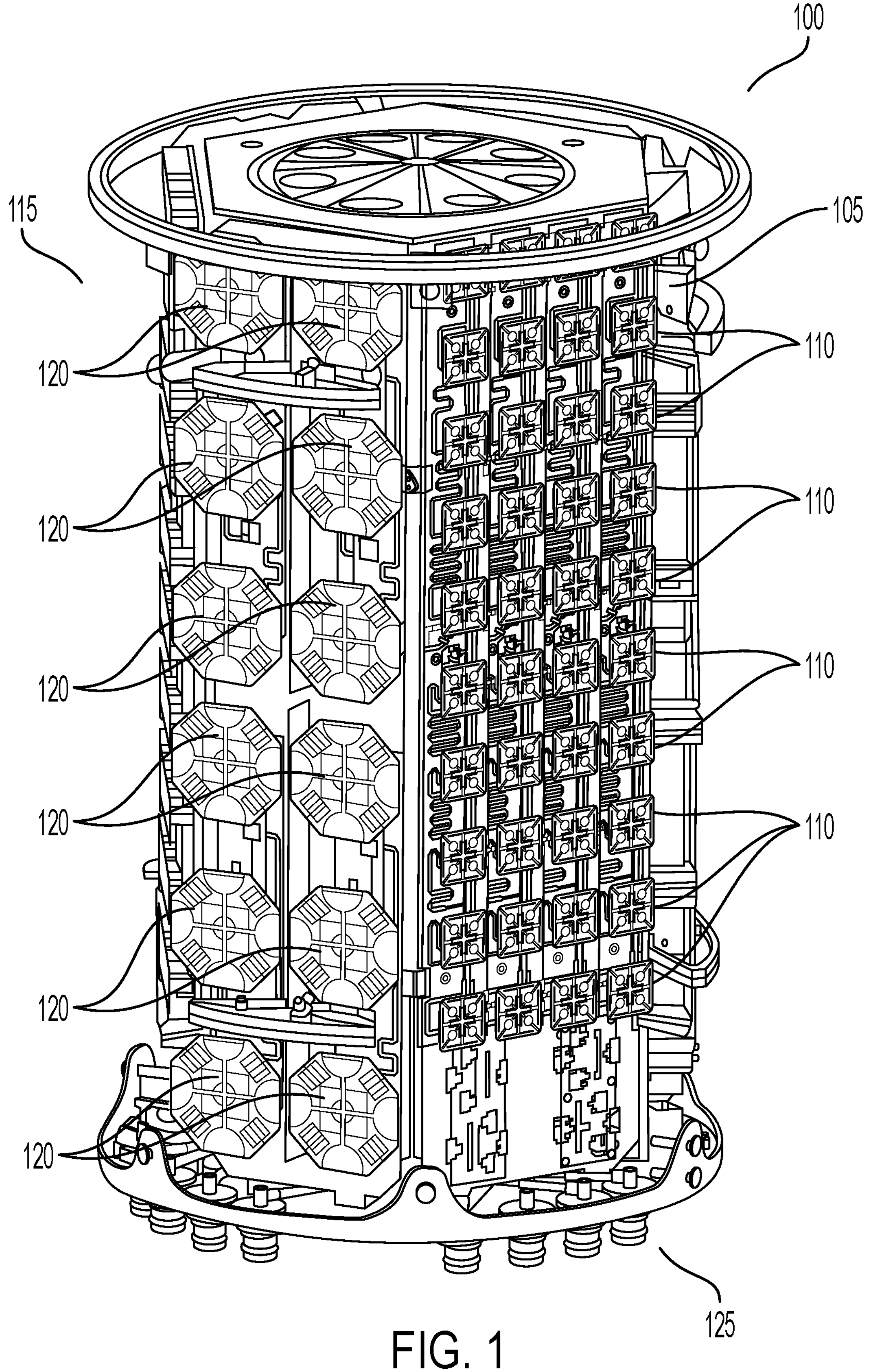
FIG. 1 illustrates an exemplary small cell antenna (with its radome removed) in which the disclosed multilayer feedboard may be integrated.

FIG. 1 illustrates an exemplary small cell antenna 100 with its radome removed. Exemplary small cell antenna 100 has an 8T8R (Eight Transmit Eight Receive) C-Band subarray 105 having four columns of ten C-Band radiators 110 on a first array face; and a midband array 115 having two columns of six midband radiators 120 on a second face.

Exemplary small cell antenna 100 has six array faces, three of which have an 8T8R array and the other three (alternating) have a midband array 115.

Figure 2:
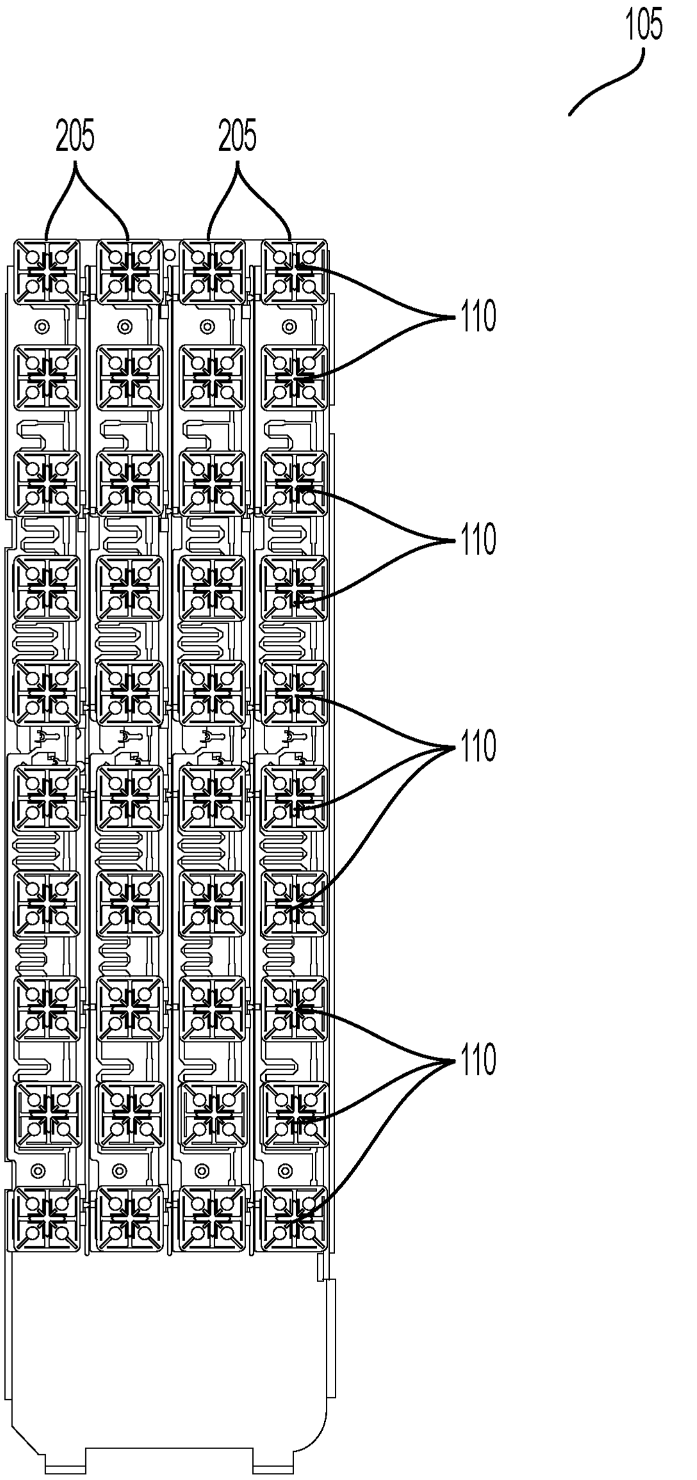
FIG. 2 illustrates four exemplary multilayer feedboards, as may be integrated into the antenna of FIG. 1.

FIG. 2 illustrates 8T8R C-Band array 105 of antenna 100. As illustrated, 8T8R C-Band array 105 has four C-Band radiator columns 205, each having ten C-Band radiators 110. Each column 205 has a single multilayer feedboard that is described below.

Figure 3:
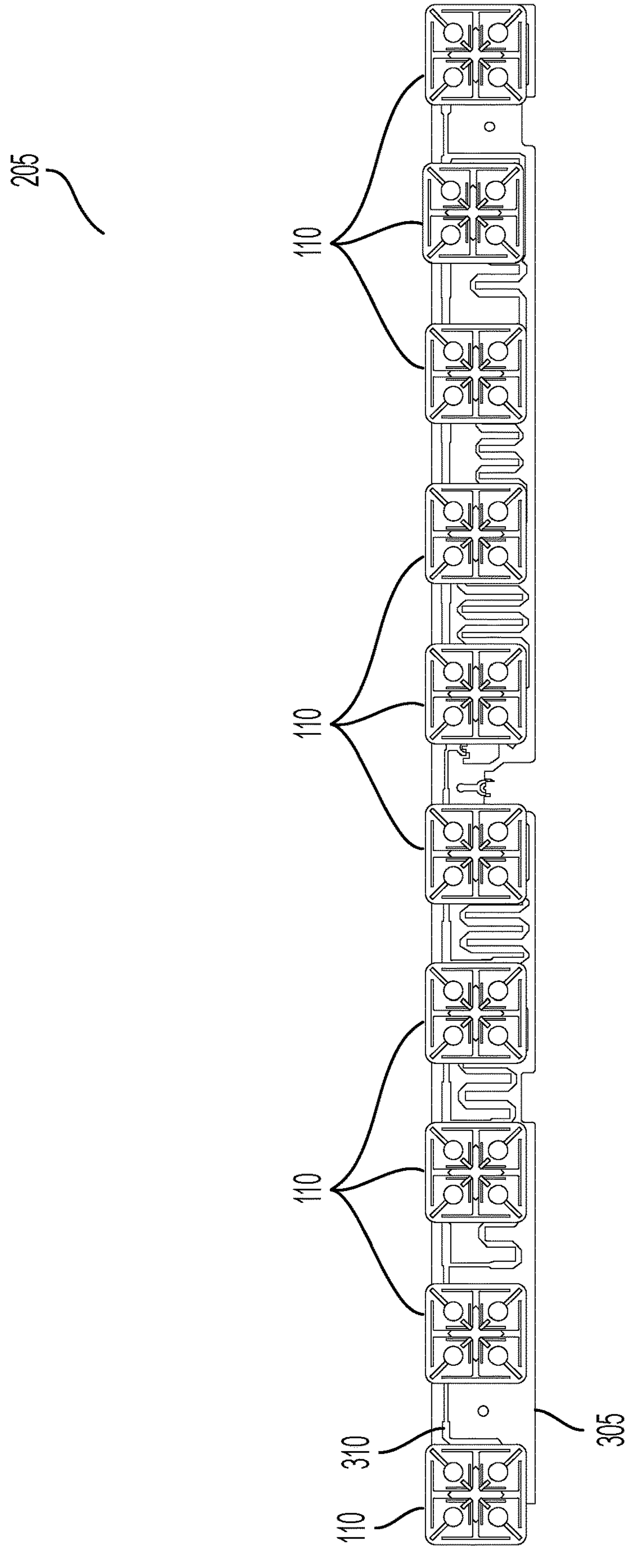
FIG. 3 illustrates an exemplary single multilayer feedboard according to the disclosure, with C-Band radiators installed.

FIG. 3 illustrates a single C-Band radiator column 205 having ten C-Band radiators 110 disposed on a single multilayer feedboard 305. Column 205 is rotated 90 degrees for the purposes of illustration. Disposed on multilayer feedboard 305 is an RF (Radio Frequency) signal trace 310, which couples dipole arms of a single signal polarization to a single signal source, which is described further below.

Figure 4A:
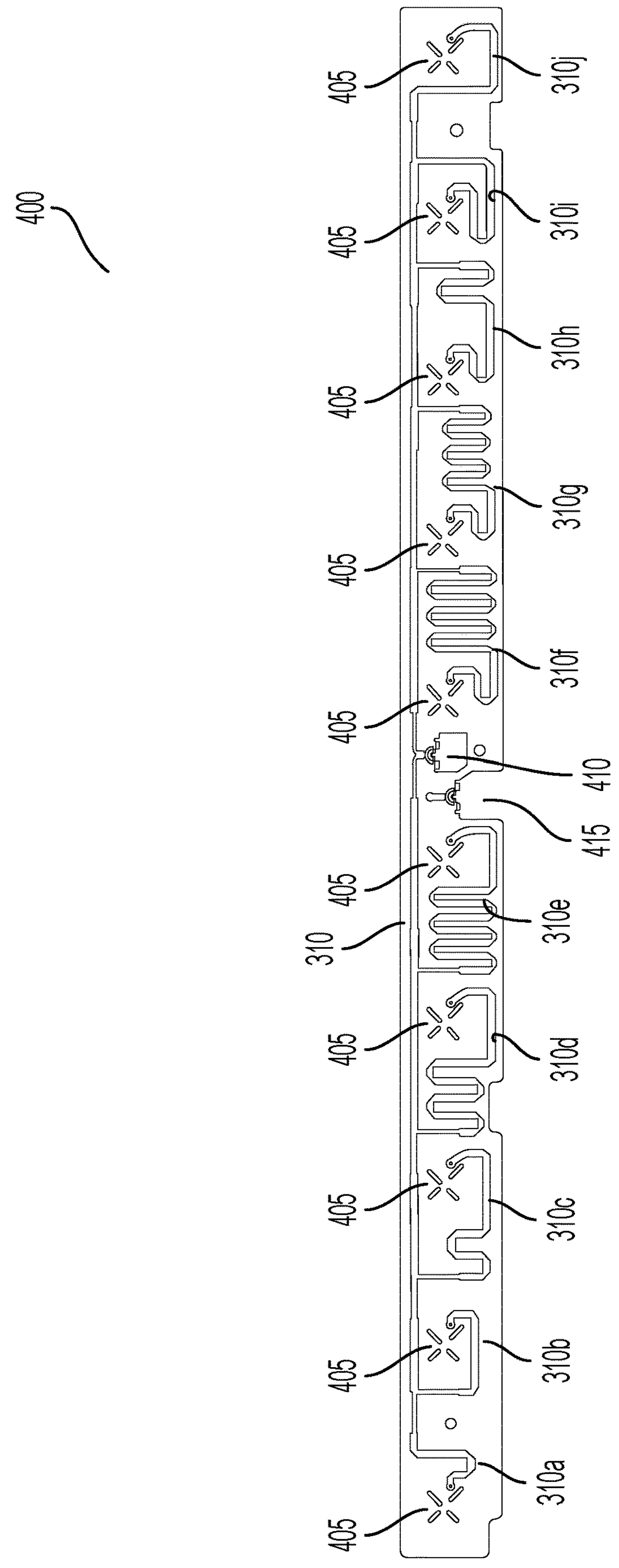
FIG. 4A illustrates an upper surface of the multilayer feedboard of FIG. 3 with the C-Band radiators removed, revealing the first signal layer of the board, wherein the first signal layer feeds an RF (Radio Frequency) signal corresponding to a first polarization orientation.

FIG. 4A illustrates a first signal layer 400, which is disposed on the upper surface (i.e., upper-most layer) of multilayer feedboard 305. As used herein, "upper" is intended to convey the layer closest to the C-Band radiators, and not necessarily a vertical positioning relative to other layers of the multilayer feedboard 305. First signal layer 400 may provide an RF signal to each of the −45 degree polarization dipoles within each C-Band radiator 110. The RF signal for the +45 degree polarization dipoles within each C-Band radiator 110 is provided by the second signal layer described below with reference to FIGS. 6A and 6B. It will be understood that the selection of −45 for the first signal layer and +45 for the second signal layer may be arbitrary and may be reversed such that the first signal layer covers +45 degree polarization.

Multilayer feedboard 305 has two RF signal launches 410 and 415. Signal launch 410 corresponds to the −45 degree polarization signal and may be directly coupled to RF signal trace 310, and signal launch 415 corresponds to the +45 degree polarization signal and its connections are described below. Signal trace 310 has a plurality of branches 310*a-j* whereby signal trace branch 310*a* couples the −45 RF signal to the leftmost C-Band radiator 110 (top C-Band radiator 110 in the column), signal trace branch 310*b* couples −45 signal to the next adjacent C-Band radiator 110 (second from top in the column), etc. Each successive signal trace branch 310*a*-310*e* has a progressively longer meander pattern such that the C-Band dipoles 110 closest to RF signal launch 410 have the longest meander pattern. The differential meander lengths set a phase progression along radiator column 205. If a boresight beam is desired, the paths 310*a-j* from signal launch 415 need to be of identical length. However, it may be desired for the beam to have a downward tilt. In this case, the lengths of the signal trace branches may be designed so that the beam formed via the subsequent array factor may be biased at a downward angle. It will be understood that such variations are possible and within the scope of the disclosure. The progressively longer meander patterns from RF signal launch 410 provide for phase alignment to compensate for the increasing distance the RF signal must travel along signal trace 310 as a function of the signal trace length from a given C-Band radiator 110 to RF signal launch 410, while also setting the desired phase distribution across the array face to steer the beam to the desired direction.

Also illustrated in FIG. 4A is a plurality of balun stem slots 405, each providing slots for balun stem tabs to be inserted for mounting the corresponding C-Band radiator 110 and terminating at solder joints for coupling RF signals and grounds, as is described below.

Figure 4B:
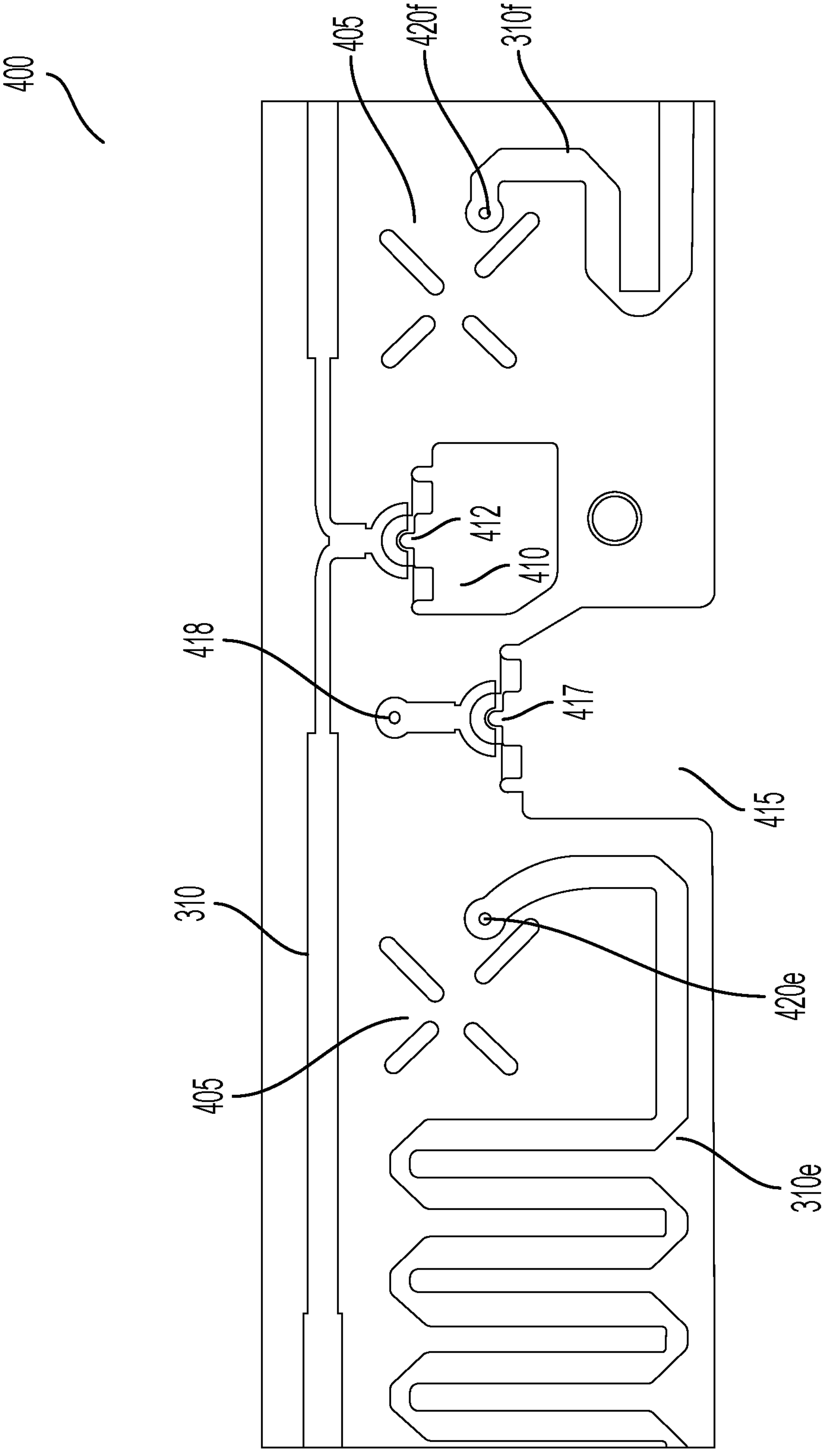
FIG. 4B is a zoomed in view of the upper surface of the multilayer feedboard (and first signal layer) of FIG. 4A.

FIG. 4B is a zoomed in view of FIG. 4A. Illustrated are signal trace branch 310*e* to the left of RF signal launch 410, and signal trace branch 310*f* to the right of RF signal launch 410. Both signal trace branches 310*e* and 310*f* respectively terminate at vias 420*e* and 420*f*, respectively, each of which carries the RF signal through multilayer feedboard 305 to a signal island conductor that is disposed with the second ground conducting layer on the lower surface of multilayer feedboard 305 and is described further below. Although not illustrated in FIG. 4B, multilayer feedboard 305 has ten such vias 420, one per C-Band radiator 110, that may be arranged in the same relative location to corresponding balun stem slots 405.

RF signal launch 415 has an inner conductor coupling point 417 that is a semicircular notch formed in the PCB (Printed Circuit Board) and is ringed with a conductor that couples to a +45 signal via 418 that couples the +45 signal from the inner conductor of the +45 signal RF cable (not shown) to a signal trace in the second signal layer described below. RF launch 410 has a similar inner conductor coupling point 412 that couples the inner conductor of the −45 RF cable (not shown) to signal trace 310.

Figure 5A:
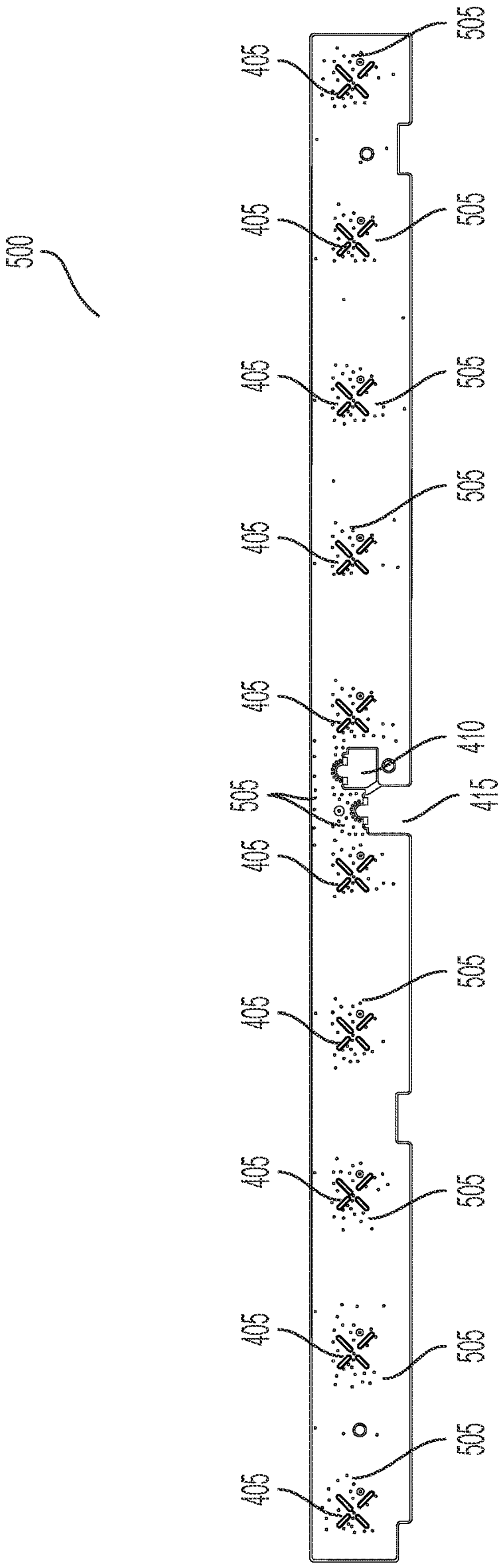
FIG. 5A illustrates a first ground layer within the multilayer feedboard of the disclosure.

FIG. 5A illustrates a first ground layer 500 that is embedded within multilayer feedboard 305 on the opposite side of a first PCB substrate (not shown) between first ground layer 500 and first signal layer 400. First ground layer 500 has a plurality of balun stem slots 405 in the same pattern as those on first signal layer 400. Disposed around balun stem slots are a plurality of vias 505 that either provide RF signals or ground to other layers as is described below.

Figure 5B:
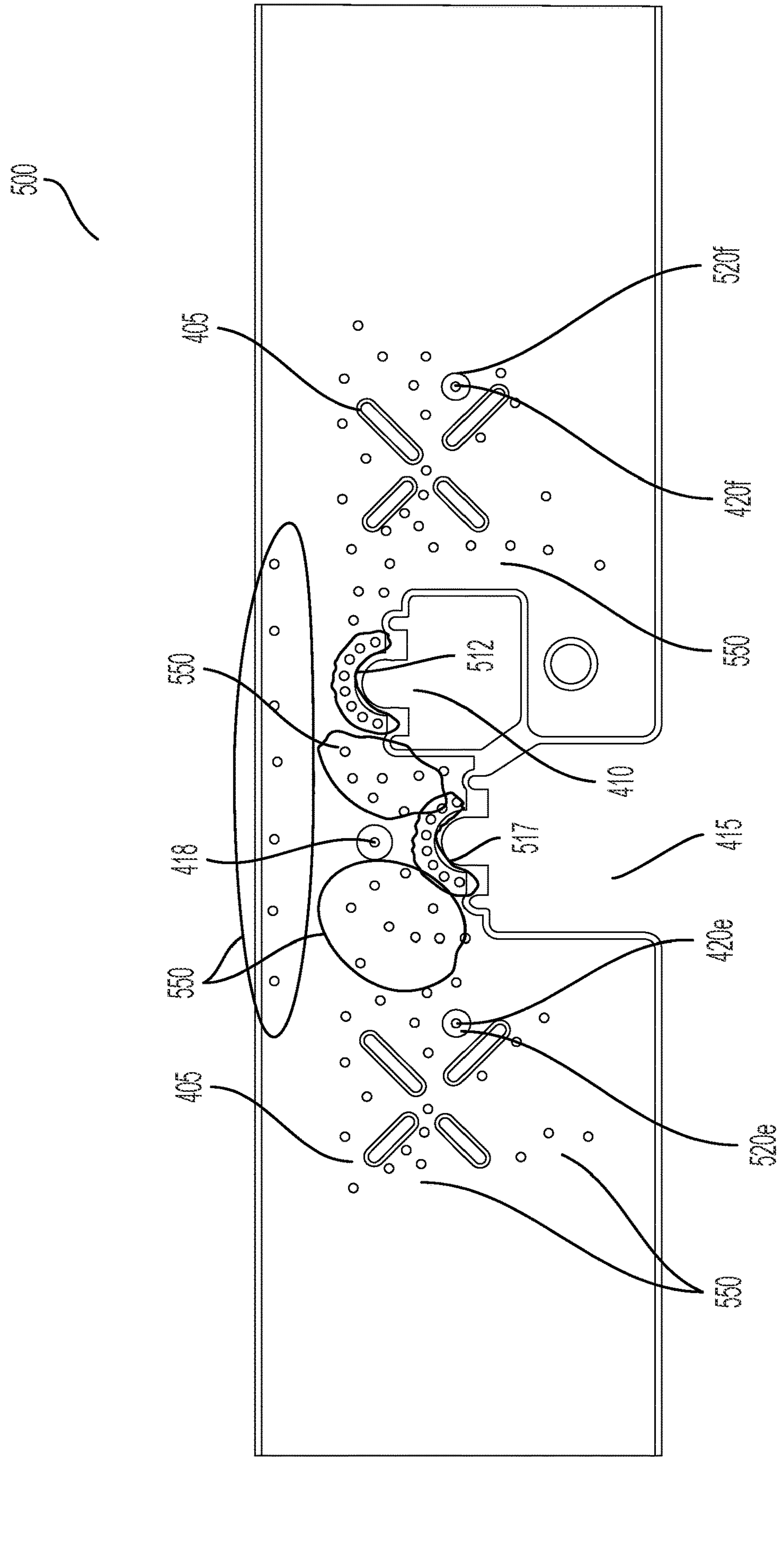
FIG. 5B is a zoomed in view of the first ground layer of FIG. 5A.

FIG. 5B is a zoomed in view of first ground layer 500. Illustrated are balun stem slots 405 for the two C-Band radiators 110 closest to RF signal launches 410 and 415. Proximate to both balun stem slots 405 are vias 420, each of which is surrounded by an isolation gap 520 that isolates the RF signal from the conductive plane of first ground layer 500. Similarly, first ground layer 500 has +45 signal via 418 that conducts the +45 signal from RF signal launch 415 to a second signal layer illustrated in FIGS. 6A and 6B and are described below. The +45 signal via has an isolation gap that provides isolation between the conducted RF signal and the ground plane of first ground layer 500. It will be noted that each radius of isolation gaps 520 are tuned for optimal impedance (i.e., ideal return loss) that depends on the geometry of the signal being coupled to/from the via.

The remaining plurality of vias 505 disposed in first ground layer 500 (and throughout multilayer feedboard 305) perform different functions.

Located in clusters are mode suppression vias 550. Each of the mode suppression vias 550 only couple first ground layer 500 to second ground layer 700 disposed on the lower surface of multilayer feedboard 500. They do not make contact with either of first signal layer 400 or second signal layer 600. Mode suppression vias 550 prevent a parallel plate waveguide resonance that may otherwise occur between first and second ground layers 500 and 700. Mode suppression vias 550 may be spaced apart from each other by a distance of less than one tenth of the wavelength corresponding to the highest frequency of the C-Band radiators 110. It will be apparent that there are regions on first ground layer 500 where no mode suppression vias 550 are present. This is due to the presence of the signal traces (e.g., signal trace 310 and 610) and the meander patters of the signal trace branches (e.g., signal trace branches 310*a-j* and 610*a-j*) of first and second signal layers 400 and 600.

Also present are two semicircular patterns of vertical transition ground vias 512 and 517. Vertical transition ground vias 512 couple both first and second ground planes 500/700 to a vertical transition clip solder pad (described below) that provides electrical continuity between the outer conductor of the −45 RF cable (not shown) to the first and second ground planes 500/700. The number of and spacing of vias within the semicircular ring of vertical transition ground vias 512 provide a ground continuity between the outer conductor of the RF cable and the ground planes to prevent return loss issues that might otherwise occur for the distance through the thickness of multilayer feedboard 305 where the inner conductor of the RF cable carrying the RF signal does not have the cable's outer conductor coaxially present because it is soldered to the solder pad on the second ground plane of the lower surface of multilayer feedboard 305. The number and spacing of transition ground vias 512 provide that interim ground along the length of the RF cable inner conductor throughout the thickness of the multilayer PCB. Similarly, vertical transition ground vias 517 couple both first and second ground planes 500/700 to a vertical transition clip solder pad (described below) that provides electrical continuity between the outer conductor of the +45 RF cable (not shown) to the first and second ground planes 500/700. The number of and spacing of vias within vertical transition ground vias 517 are done under the same considerations as those of vertical transition ground vias 512.

Figure 6A:
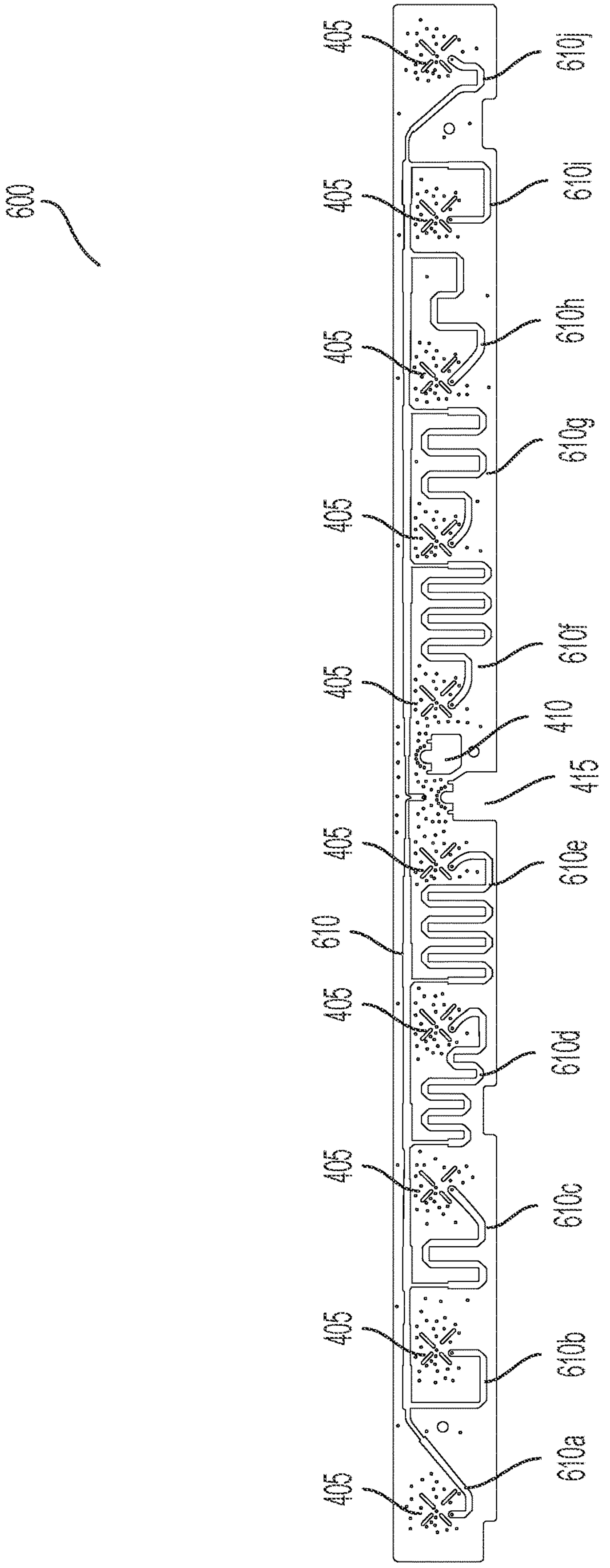
FIG. 6A illustrates a second signal layer of the multilayer feedboard of the disclosure, wherein the second signal layer feeds an RF signal corresponding to a second polarization orientation.

FIG. 6A illustrates an exemplary second signal layer 600 within multilayer feedboard 305. Second signal layer 600 has an RF signal trace 610 that has ten signal trace branches 610*a-j*, each corresponding to a +45 dipole of a corresponding C-Band radiator 110. As with first signal layer 400, the meander lines of signal trace branches 610*a-j* provide phase alignment and compensation for the different distances of C-Band radiators 110 from the +45 signal launch 415. Also illustrated are balun stem slots 405 that are contiguous with corresponding balun stem slots 405 of the other layers of multilayer feedboard 305.

Figure 6B:
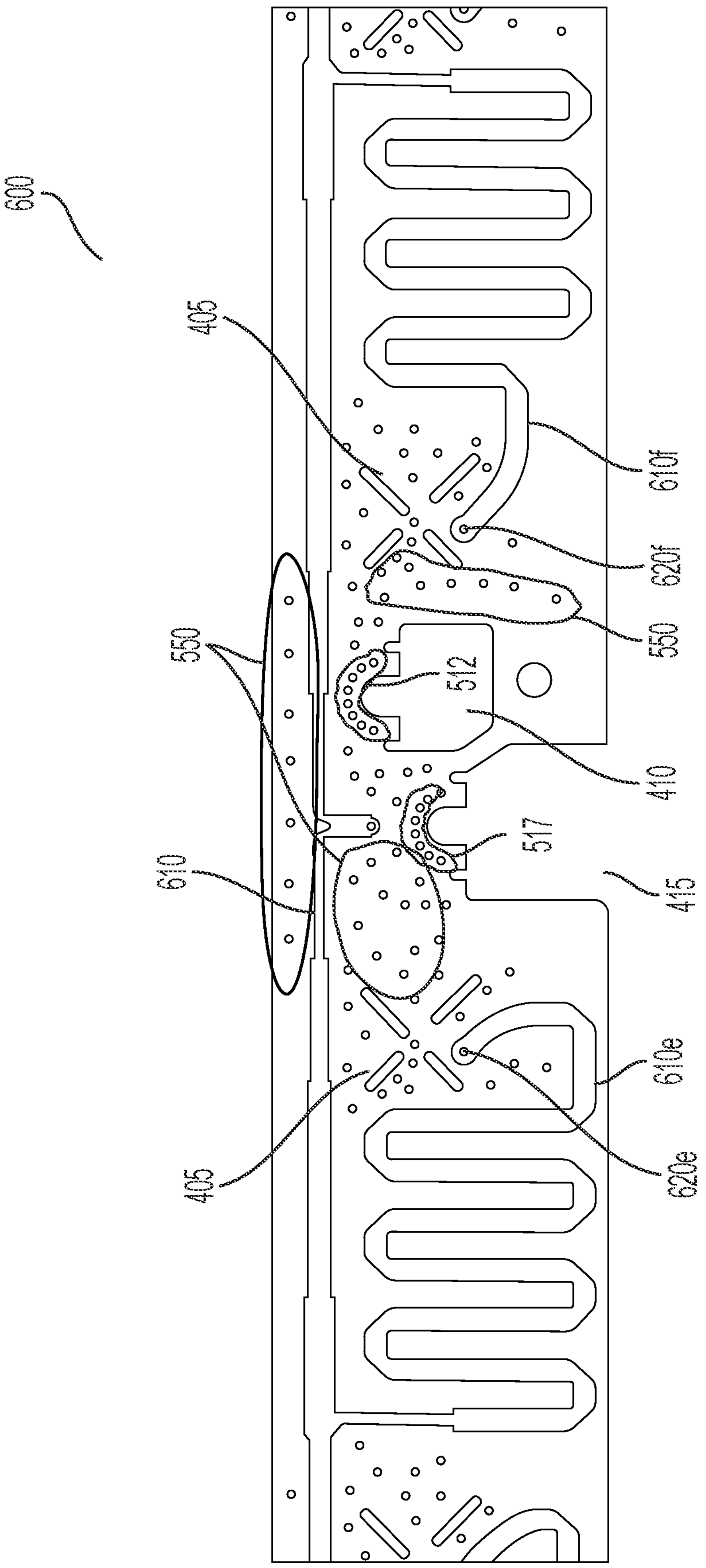
FIG. 6B is a zoomed in view of the second signal layer of FIG. 6A.

FIG. 6B is a zoomed in view of FIG. 6A. Illustrated are signal trace 610, signal trace branches 610*e* and 610*f* with their corresponding balun stem slots 405, and respective +45 RF signal launch 415 and −45 RF signal launch 410. Also illustrated are vertical transition ground vias 517 and 512, described earlier. Also illustrated are mode suppression vias 550, which electrically couple first ground layer 500 and second ground layer 700 between which second signal layer 600 is sandwiched within multilayer feedboard 305. Signal trace branch 610*e* terminates at a signal via 620*e*, which passes through the PCB layer between second signal layer 600 and second ground layer 700 for carrying its +45 RF signal to the balun stem solder joint (not shown) on second ground layer 700 for carrying the signal to the +45 dipole of corresponding C-Band radiator 110. The same applies to signal trace branch 610*f* and its corresponding via 620*f*. One will note that vias 620*e* and 620*f*—and the same applies to vias coupled to +45 signal trace branches 610*a-d* and 610*f-j* (not shown)—is that these vias terminate at second signal layer 600 and do not pass upward to first ground layer 500 or first signal layer 400.

Figure 7A:
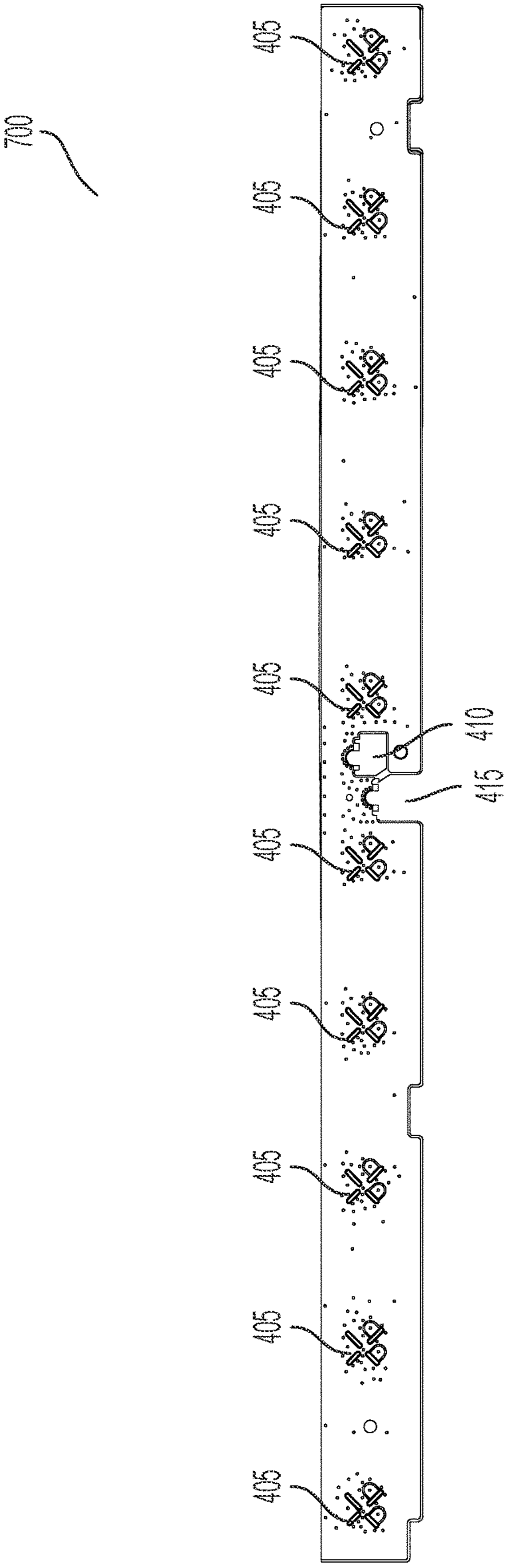
FIG. 7A illustrates a lower surface of the disclosed multilayer feedboard, revealing the second ground layer of the board.

FIG. 7A illustrates second ground layer 700, which is disposed on a lower surface of multilayer feedboard 305. Illustrated are balun stem slots 405, −45 RF signal launch 410, and +45 RF signal launch 45.

Figure 7B:
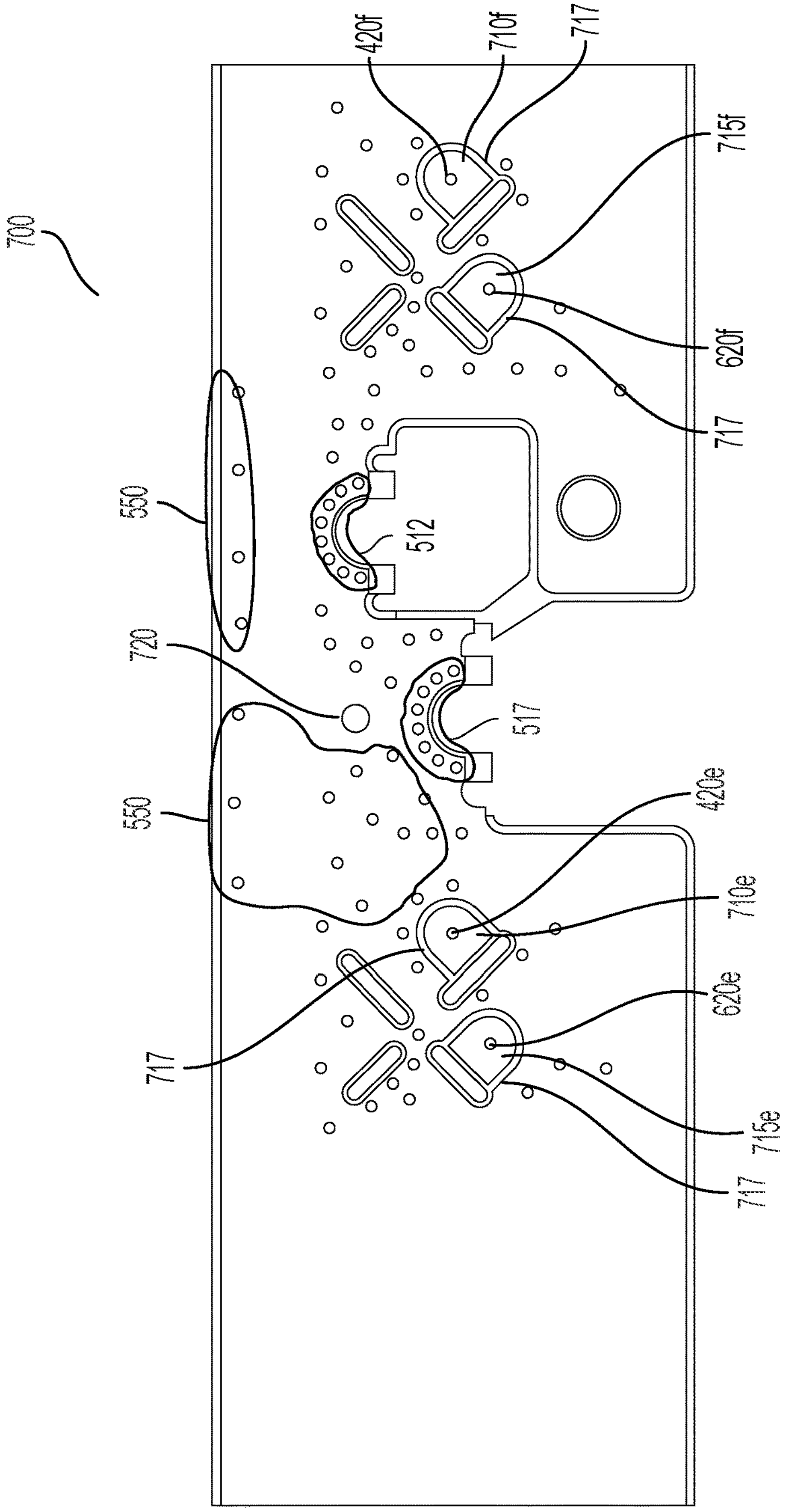
FIG. 7B is a zoomed in view of FIG. 7A, showing the second layer and signal island conductors.

FIG. 7B is a zoomed in view of the second ground layer 700 of FIG. 7A. Illustrated are the −45 vertical transition ground vias 512 and +45 vertical transition ground vias 517, and mode suppression vias 550, all of which couple second ground layer 700 to first ground layer 500. Second ground layer 700 has a plurality of open areas 717. Disposed within each open area 717 is an RF signal island conductors 710 or 715. Illustrated in FIG. 7B are four RF signal islands: −45 signal island conductor 710*e* that couples to −45 signal trace branch 410*e* through via 420*e* illustrated in FIG. 4B; −45 signal island conductor 710*f* that couples to −45 signal trace branch 410*f* through via 420*f* illustrated in FIG. 4B; +45 signal island conductor 715*e* that couples to +45 signal trace branch 610*e* through via 620*e* illustrated in FIG. 6B; and +45 signal island conductor 715*f* that couples to +45 signal trace branch 610*f* through via 620*f* illustrated in FIG. 6B. It will be understood that second ground layer 700 has open regions for −45 signal island conductors 710*a-j* and +45 signal island conductors 715*a-j* that are not shown in FIG. 7B due to the zoomed in view. Signal islands 710*a-j* and 715*a-j* may be referred to as co-planar waveguides as they are conductors that are co-planar to the ground conductor of second ground layer 700. Signal island conductors 710*a-j* and 715*a-j* serve as a base for solder pads (shown below) for coupling the −45 RF signal or +45 RF signal to the corresponding dipole of their corresponding C-Band radiator 110. In the illustrated example, the open areas (or regions) 717 in second ground layer 700 conform to the shape of signal island conductors 710 and 715 such that a gap is present between the signal island conductor 710/715 and the surrounding second ground layer 700. The width of signal island conductors 710/715 and the width of the gap between them and the surrounding second ground layer 700 may be selected to be matched to the system impedance (for example 50 Ohms). Also illustrated is a back-drill hole 720, which corresponds to the +45 signal via 418 illustrated in FIG. 4B, and which is further described below.

Figure 8:
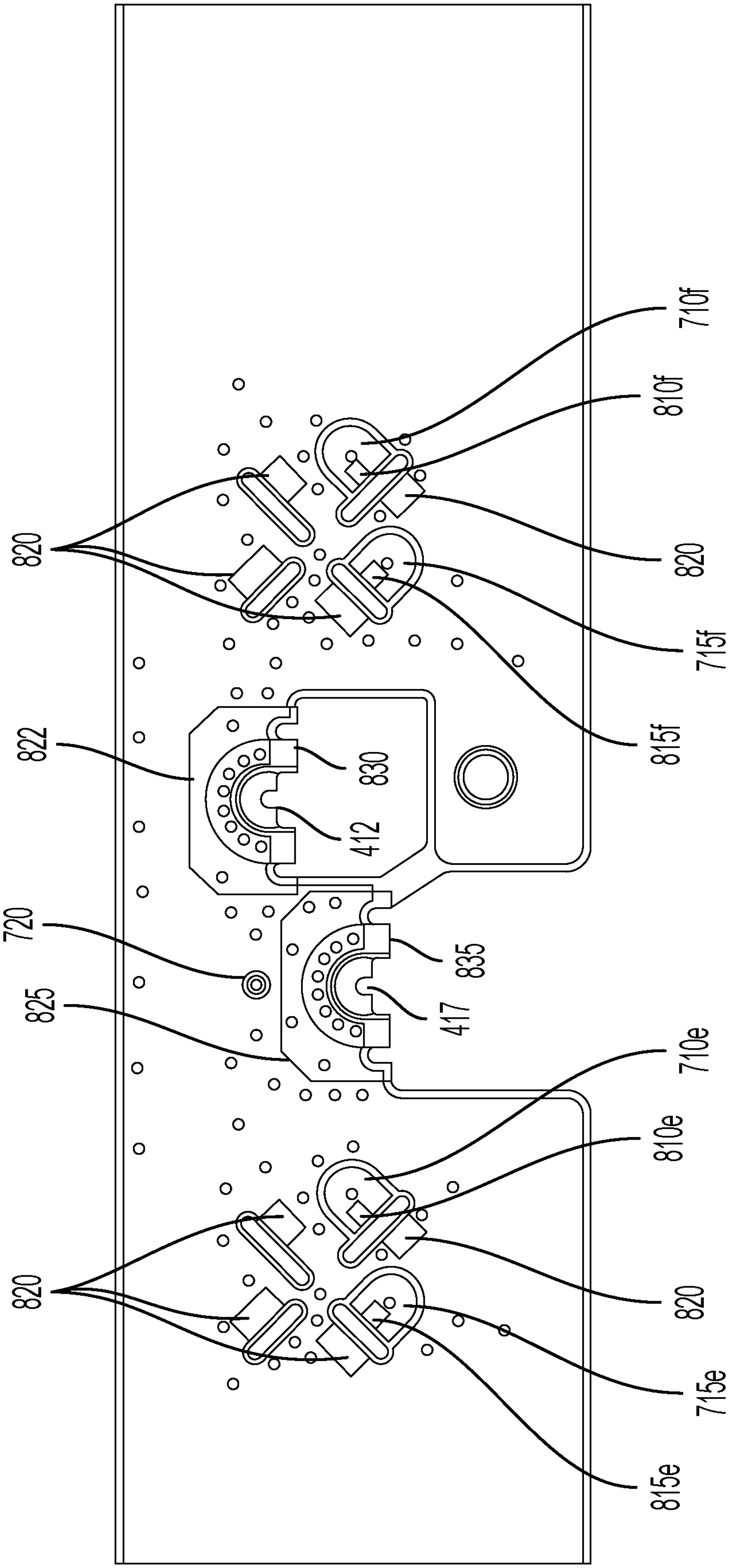
FIG. 8 is a zoomed in view of the lower surface of the multilayer feedboard of the disclosure.

FIG. 8 is a zoomed in view of the lower surface of multilayer feedboard 305, showing second ground layer 700 along with −45 inner conductor coupling point 412 and +45 inner conductor coupling point 417. Also shown is a −45 ground solder pad 822 and a +45 ground solder pad 825, each respectively coupled to vertical transition ground vias 512 and 517. Disposed on −45 ground solder pad is an annular solder mask 830, which protects the vertical transition ground vias 512 in the solder process in which the outer conductor of the −45 RF signal cable (not shown) is soldered to second ground layer 700. Similarly, disposed on +45 ground solder pad is an annular solder mask 835, which protects the vertical transition ground vias 517 in the solder process in which the outer conductor of the +45 RF signal cable (not shown) is soldered to second ground layer 700. Disposed on −45 signal island 710*e* is a signal solder pad 810*e*, which enables soldering to provide electrical continuity between −45 signal island 710*e* and the −45 dipole of corresponding C-Band radiator 110 via a balun signal trace (not shown). Similarly, disposed on −45 signal island 710*f* is a signal solder pad 810*f*, which enables soldering to provide electrical continuity between −45 signal island 710*f* and the −45 dipole of corresponding C-Band radiator 110 via a balun signal trace (not shown). Disposed on +45 signal island 715*e* is a signal solder pad 815*e*, which enables soldering to provide electrical continuity between +45 signal island 715*e* and the +45 dipole of corresponding C-Band radiator 110 via a balun signal trace (not shown). Similarly, disposed on +45 signal island 715*f* is a signal solder pad 815*f*, which enables soldering to provide electrical continuity between +45 signal island 715*f* and the +45 dipole of corresponding C-Band radiator 110 via a balun signal trace (not shown). Solder pads 820 couple ground balun traces (not shown) on corresponding C-Band radiator 110 to second ground layer 700.

Figure 9:
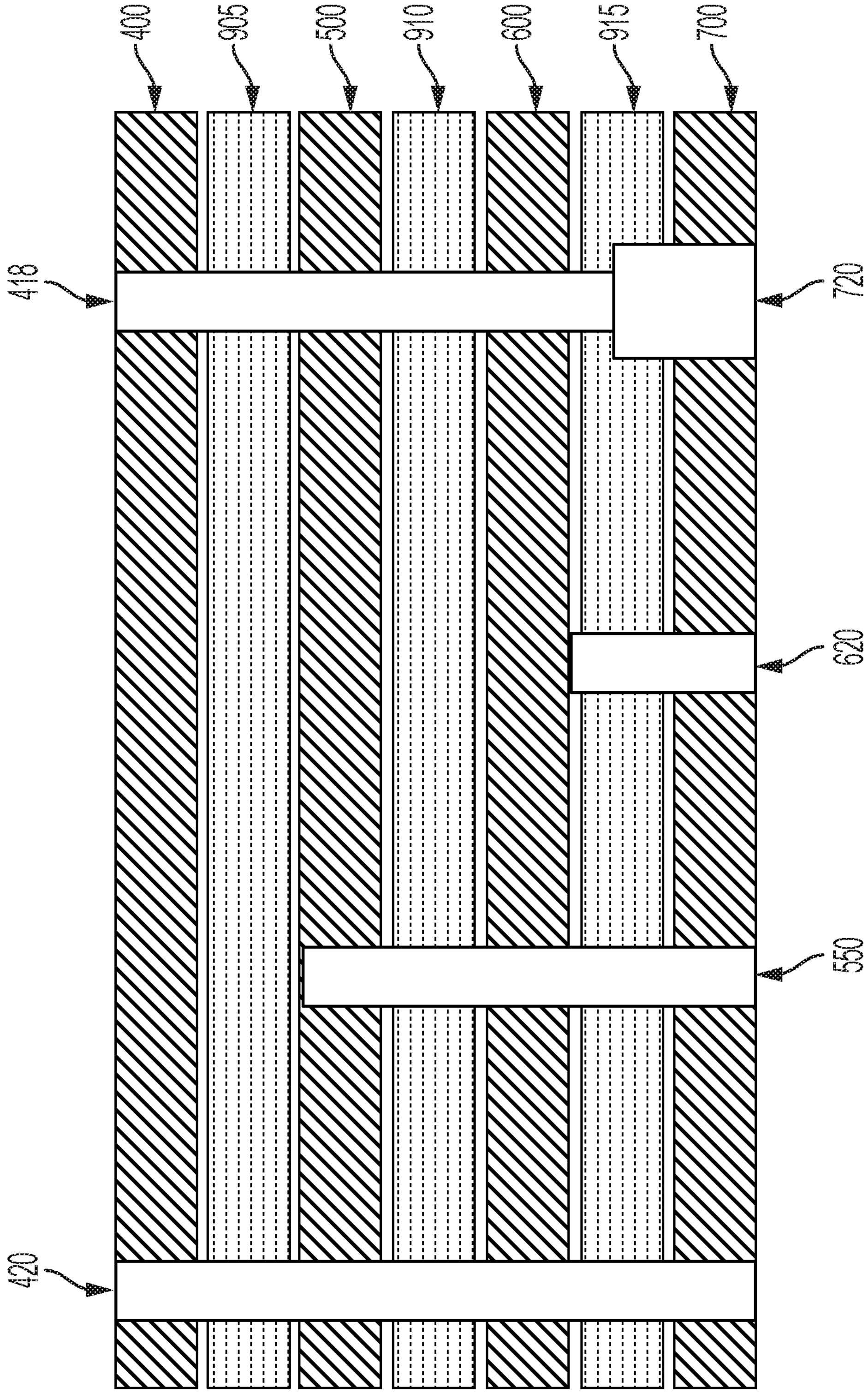
FIG. 9 is a diagram of the different layers of the disclosed multilayer feedboard, including materials and dimensions as well as via depths.

FIG. 9 is a diagram showing a cross section of multilayer feedboard 305, showing the different layers. As illustrated, first signal layer 400 is disposed on a PCB layer 905; first ground layer 500 is disposed on a PCB layer 910; second signal layer 600 is disposed on PCB layer 915; and disposed on the opposite surface of PCB layer 915 is second ground layer 700. The entire assembly is glued or otherwise adhered to form the entire structure of multilayer feedboard 305 using multilayer PCB bonding techniques. As described above, the +45 and −45 RF signals couple to corresponding signal traces on first signal layer 400. The −45 signal is coupled to islands 710*a-j* (not shown) on second ground layer 700 through vias 420 illustrated in the diagram. The +45 signal is coupled to second signal layer 600 through via 418, and then coupled to islands 715*a-j* (not shown) through vias 620 illustrated in the diagram. Further to via 418 is back drill hole 720. Back drill hole 720 is formed by having the metal of second ground layer 700 pulled back with a clearance, and then drilled into PCB layer 915, thereby isolating via 418 from second ground layer 700.

Accordingly, the multilayer feedboard 305 of the disclosure has all of the solder joints accessible at its lower surface, easing manufacturing and enabling automated soldering. Another advantage is that the multilayer feedboard 305 reduces the cabling required in antenna 100. Reducing the required cabling not only reduces the cost and mass of antenna 100, it helps improve manufacturing yield by minimizing the number of cable solder joints. Another advantage of eliminating much of the cabling is that it enables much denser antenna array face arrangement by eliminating the volume taken up by the required cabling.

Variations to multilayer feedboard 305 are possible. For example, although the exemplary embodiment is disclosed as having ten C-Band radiators, it will be understood that more or fewer radiators, or radiators of a different frequency band, are possible and within the scope of the disclosure. Further, although the disclosed multilayer feedboard 305 is disclosed in the context of a C-Band 8T8R array, it will be understood that it may be used in other antenna configurations, including radiators of a different frequency band, having a plurality of the radiators disposed in a row or column.

What is claimed is:

1. An antenna having a plurality of columns of radiators, wherein each column of radiators has a multilayer feedboard, the multilayer feedboard comprising:

a first signal layer, the first signal layer having a first signal launch and a second signal launch, the first signal layer having a first signal trace coupled to the first signal launch, wherein the first signal trace has a plurality of first signal trace branches wherein each of the plurality of first signal trace branches is coupled to a corresponding one of a plurality of first signal vias, and wherein the first signal layer has a second signal main via that is coupled to the second signal launch;

a first ground layer having a plurality of mode suppression vias, and a plurality of isolation gaps, each isolation gap surrounding a corresponding one of the plurality of first signal vias;

a second signal layer having a second signal trace with a plurality of second signal trace branches, each of the second signal trace branches is coupled to one of a plurality of second signal vias, wherein the second signal trace is electrically coupled to the second signal main via; and a second ground layer having a plurality of first open regions and second open regions, and within each first open region is disposed a corresponding first signal island conductor, and within each second open region is disposed a corresponding second signal island conductor, wherein each of the first signal island conductors is coupled to a corresponding one of the plurality of first signal vias and each of the second signal island conductors is coupled to a corresponding one of the plurality of second signal vias.

2. The antenna of claim 1, wherein the first ground layer and the second ground layer are electrically coupled by the plurality of mode suppression vias.

3. The antenna of claim 2, wherein the mode suppression vias are spaced such to mitigate parallel plate waveguide resonance between the first and second ground layers.

4. The antenna of claim 2, wherein the plurality of mode suppression vias are spaced at a distance less than one tenth of a wavelength corresponding to a maximum frequency of the plurality of radiators.

5. The antenna of claim 1, wherein the first ground layer and the second ground layer are electrically coupled by a first and second plurality of vertical transition ground vias, wherein the first plurality of vertical transition ground vias are coupled to a first vertical launch outer conductor solder pad disposed on the second ground layer, and wherein the second plurality of vertical transition ground vias are coupled to a second vertical launch outer conductor solder pad disposed on the second ground layer.

6. The antenna of claim 5, wherein the first plurality of vertical transition ground vias are covered by a first solder mask, and wherein the second plurality of vertical transition vias are covered by a second solder mask.

7. The antenna of claim 1, wherein each of the plurality radiators has a +45 dipole and a −45 dipole.

8. The antenna of claim 7, Wherein the first signal launch is electrically coupled to the −45 dipole of each of the plurality of radiators, and wherein the second signal launch is electrically coupled to the +45 dipole of each of the plurality of radiators.

9. The antenna of claim 1, wherein the plurality of radiators comprises C-Band radiators.

10. The antenna of claim 1, wherein each of the plurality of columns of radiators comprises ten radiators.

11. An antenna having a plurality of columns of radiators, wherein each column of radiators has a multilayer feedboard, the multilayer feedboard comprising:

a first signal layer disposed on a surface of a first PCB (Printed Circuit Board) layer closest to the corresponding column of radiators, the first signal layer having a first signal launch and a second signal launch, the first signal layer having a first signal trace coupled to the first signal launch, wherein the first signal trace has a plurality of first signal trace branches wherein each of the plurality of first signal trace branches is coupled to a corresponding one of a plurality of first signal vias, and wherein the first signal layer has a second signal main via that is coupled to the second signal launch;

a first ground layer disposed between the first PCB layer and a second PCB layer, the first ground layer having a plurality of mode suppression vias, and a plurality of isolation gaps, each isolation gap surrounding a corresponding one of the plurality of first signal vias;

a second signal layer disposed between the second PCB layer and a third PCB layer, the second signal layer having a second signal trace with a plurality of second signal trace branches, each of the second signal trace branches is coupled to one of a plurality of second signal vias, wherein the second signal trace is electrically coupled to the second signal main via; and a second ground layer disposed on a lower surface of the third PCB layer, the second ground layer having a plurality of first open regions and second open regions, and within each first open region is disposed a corresponding first signal island conductor, and within each second open region is disposed a corresponding second signal island conductor, wherein each of the first signal island conductors is coupled to a corresponding one of the plurality of first signal vias and each of the second signal island conductors is coupled to a corresponding one of the plurality of second signal vias.

12. The antenna of claim 11, wherein the first ground layer and the second ground layer are electrically coupled by the plurality of mode suppression vias.

13. The antenna of claim 12, wherein the mode suppression vias are spaced such to mitigate parallel plate waveguide resonance between the first and second ground layers.

14. The antenna of claim 12, wherein the plurality of mode suppression vias are spaced at a distance less than one tenth of a wavelength corresponding to a maximum frequency of the plurality of radiators.

15. The antenna of claim 11, wherein each of the plurality radiators has a +45 dipole and a −45 dipole.

16. The antenna of claim 15, Wherein the first signal launch is electrically coupled to the −45 dipole of each of the plurality of radiators, and wherein the second signal launch is electrically coupled to the +45 dipole of each of the plurality of radiators.

* * * * *